United States Patent [19]

Abdulmassih

[11] Patent Number: 5,026,487
[45] Date of Patent: Jun. 25, 1991

[54] METHOD AND APPARATUS FOR INTERMITTENT COMPRESSION OF FIBROUS MATERIAL TO AID REMOVAL FROM A FILTER SURFACE

[75] Inventor: Antoine G. Abdulmassih, Burlington, Mass.

[73] Assignee: Ingersoll-Rand Company, Woodcliff Lake, N.J.

[21] Appl. No.: 471,953

[22] Filed: Jan. 29, 1990

[51] Int. Cl.$^5$ .............................................. B01D 33/76
[52] U.S. Cl. ..................... 210/791; 210/396; 210/408; 210/541; 15/256.51; 68/181 R; 162/281
[58] Field of Search ............... 210/396, 397, 408, 413, 210/414, 415, 541, 791; 15/256.5, 256.51; 162/281, 282; 68/181 R

[56] References Cited

U.S. PATENT DOCUMENTS

| | | | |
|---|---|---|---|
| 1,475,244 | 11/1923 | Rolls | 210/396 |
| 2,070,074 | 2/1937 | Young | 210/396 |
| 2,363,840 | 11/1944 | Denhard | 210/396 |
| 2,680,996 | 6/1954 | Brown | 162/296 |
| 3,520,410 | 7/1970 | Hutto, Jr. | 210/791 |
| 4,689,119 | 8/1987 | Weldon | 162/281 |
| 4,919,877 | 4/1990 | Parsons et al. | 162/281 |

Primary Examiner—Stanley S. Silverman
Assistant Examiner—Christopher Upton
Attorney, Agent, or Firm—Robert F. Palermo; Walter C. Vliet

[57] ABSTRACT

A method and apparatus is provided for aiding in the removal of a fibrous material sheet from a smooth porous filter surface. An intermittent pattern of round-bottomed compression irregularities is impressed upon the sheet blunt round-edged device to cause it to be released from the filter surface in the areas where the irregularities are impressed by the device so that it will not stick to the filter surface nor split when it is contacted by the doctor device which guides it away from the filter surface. The spacing and the geometry of the compression pattern are according to the pulp characteristics and the operating conditions of the filter.

12 Claims, 3 Drawing Sheets

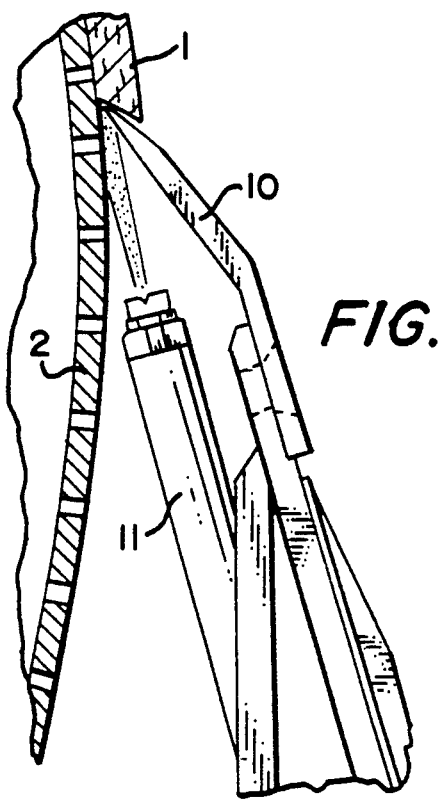
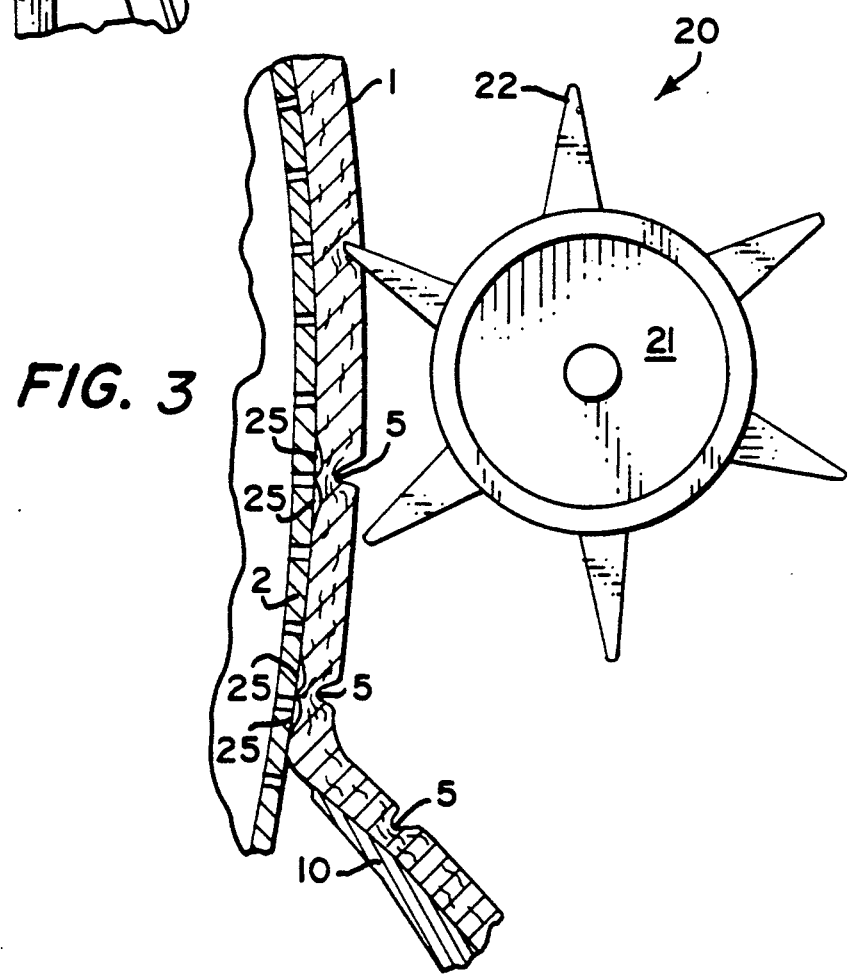

METHOD AND APPARATUS FOR INTERMITTENT COMPRESSION OF FIBROUS MATERIAL TO AID REMOVAL FROM A FILTER SURFACE

BACKGROUND OF THE INVENTION

This invention relates generally to fibrous material pulp processing and more particularly to removal of a pulp sheet from a filter surface.

In processing of fibrous material, washing and/or filtering is typically performed on the pulp in the form of a pulp sheet or aggregate. The pulp sheet is typically formed on a foramenous filter surface in response to a pressure gradient across the filter. Filters may be configured as flat belts, flat or contoured disks, cylindrical drums, or other shapes.

The pressure gradient may be created by a vacuum maintained upon the downstream, inner, or bottom side of the filter, by a slight positive pressure maintained upon the pulp slurry feedstock on the upstream, outer, or top side of the filter, or by a gravity drain. In either case, the aggregate forms as the pulp is filtered from the slurry when the liquor passes through the foramenous filter surface in response to the pressure gradient described.

Following the washing and thickening operations, the pressure differential is interrupted and the pulp sheet is removed from the filter. Removal is typically accomplished with the aid of a doctor device which separates the sheet from the filter surface and directs it to a conveyor mechanism. This doctor device usually consists of a thin blade or a counterrotating toothed roll usually assisted by a water, steam, or air nozzle. Due to dimensional defects, mechanical deflections, and thermal gradients, the filter surface is slightly distorted. If a steel doctor blade or roll is used, contact between it and the filter surface can cause damage to the filter and to the doctor device. If plastic or composite blades or rolls are used and if there is contact, they can wear away and deposit plastic particles or shreds in the pulp sheet. These plastic inclusions are defects in the pulp which cannot be washed out. In order to avoid damage to the pulp, the filter, or the doctor device, a gap is maintained between them.

Formation of the sheet on the filter surface due to the pressure differential results in dimples on the bottom side of the aggregate which are caused by some of the pulp fibers partially entering the perforations on the foramenous filter surface. The inherent stickiness of a wet pulp sheet together with the pulp dimples creates a high degree of adhesion between the pulp sheet and the filter.

In overcoming the adhesive force, the doctor device sometimes splits the pulp sheet and allows some fraction of the adhering pulp to pass beneath the doctor device. The adherent pulp may build up and jam beneath the doctor causing damage to either the doctor, the filter, or both. It may also cause a loss of filtering and/or washing capacity due to plugging of the filter surface perforations. Pulp which passes beneath the doctor must be removed and recycled. This results in a loss of capacity.

The foregoing illustrates limitations known to exist in present methods of pulp sheet removal. Thus, it is apparent that it would be advantageous to provide alternatives directed to overcoming one or more of the limitations set forth above. Accordingly, a suitable alternative is provided including features more fully disclosed hereinafter.

SUMMARY OF THE INVENTION

One object of this invention is to provide a method and apparatus which will completely remove the pulp sheet leaving a clean filter.

Another object is to achieve the clean filter using a large doctor gap which prevents contact between the doctor and the filter and avoids plastic inclusions.

A still further object is to provide the method and apparatus such that it is effective under all practical operating conditions as to basis weight, discharge consistency, and pulp type.

These and other objects are obtained in a method and apparatus for aiding in the removal of a wet fibrous pulp sheet from a smooth porous filtering surface. This includes providing a device to compress the pulp sheet to form a pattern of round-bottomed compression irregularities upon the pulp sheet at the pulp take-off zone of the filter, and another device to physically direct the sheet as it is released from the filter.

The foregoing and other aspects will become apparent from the following detailed description of the invention when considered in conjunction with the accompanying drawing figures. It is to be expressly understood that the drawing figures are not intended to limit the invention but are for illustration of the preferred embodiment.

BRIEF DESCRIPTION OF THE DRAWINGS

FIG. 2 is a schematic depiction of a doctor in operation.

FIG. 3 is a schematic transverse sectional elevation view of the compressor roll, the pulp sheet, the filter surface, and the doctor knife.

DETAILED DESCRIPTION OF THE PREFERRED EMBODIMENT

Experiments have shown that locally compressing the pulp sheet with a round-edged device causes release of the sheet from the filter adjacent the compressed areas. In addition, the compressed areas have more resistance to splitting by the doctor during removal from the filter. These experiments further indicate that the required spacing for the compressed areas depends upon the characteristics of the pulp being treated and the operating speed.

Figure 1:
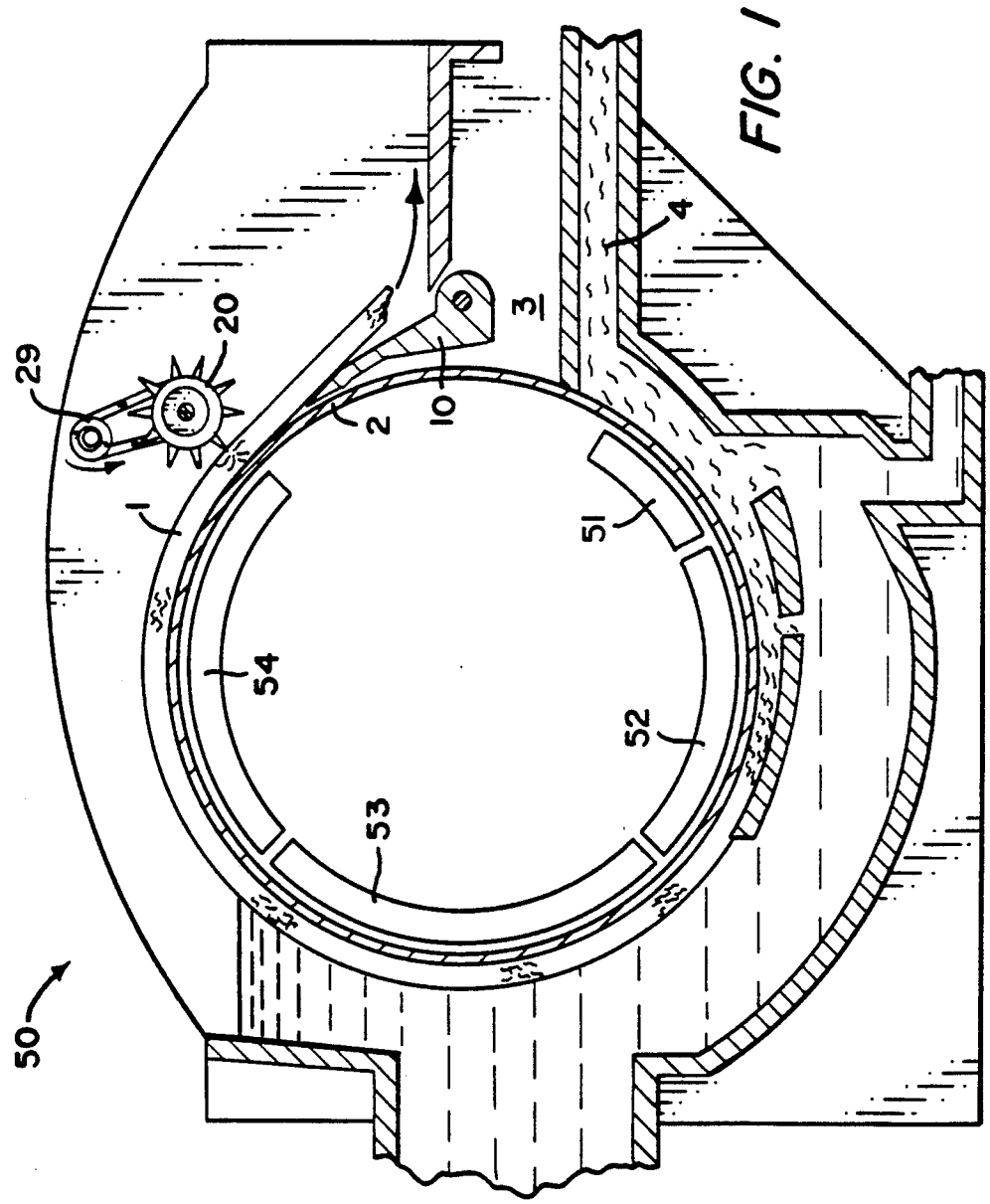
FIG. 1 is a schematic representation of a transverse elevation cross sectional view of a pressurized drum type filter.

In FIG. 1, a pressurized drum type filter 50 is shown to illustrate the general layout and interrelationship between the various components of the system. The pulp slurry 4 is fed into contact with the filter drum surface plate 2 at the formation zone 51 of the drum where the pressure differential caused by the slightly elevated external pressure forces the pulp slurry against the perforated filter surface plate 2 and forms the pulp sheet 1 as the pulp liquor flows through the filter surface plate. In the compaction zone 52, the pulp sheet 1 is squeezed to eliminate the excess of the pulp liquor. The pulp sheet is then washed to remove the remaining pulp liquor in the wash zone 53 of the pressurized filter drum. After being washed, the pulp enters the dewatering zone 54 where excess water is extracted from the pulp sheet. Note that the pressure is continuously applied from the time the slurry contacts the drum in the formation zone through the compaction zone, the washing zone, and the dewatering zone. Pressure is discontinued, after the dewatering zone, in the takeoff zone.

At the end of the dewatering zone 54, immediately prior to the takeoff zone, the pulp sheet passes under the pulp compressor 20, whose speed is controlled by drive 29, and is subjected to continuously repeated contacts by blunt round-edged vanes which impose a pattern of intermittent compression on the pulp sheet in order to improve takeoff efficiency. Takeoff is accomplished by the doctor blade 10 assisted by an optional air, water, or steam knife 11 which lifts the pulp sheet from the drum deck 2 and deposits it on a takeup mechanism. If the doctor blade 10 splits the pulp sheet 1 or otherwise leaves any pulp crumbs on the drum, these pass into the crumb sluicing chamber 3 from which they are returned to the pulp slurry for reprocessing.

Figure 4:
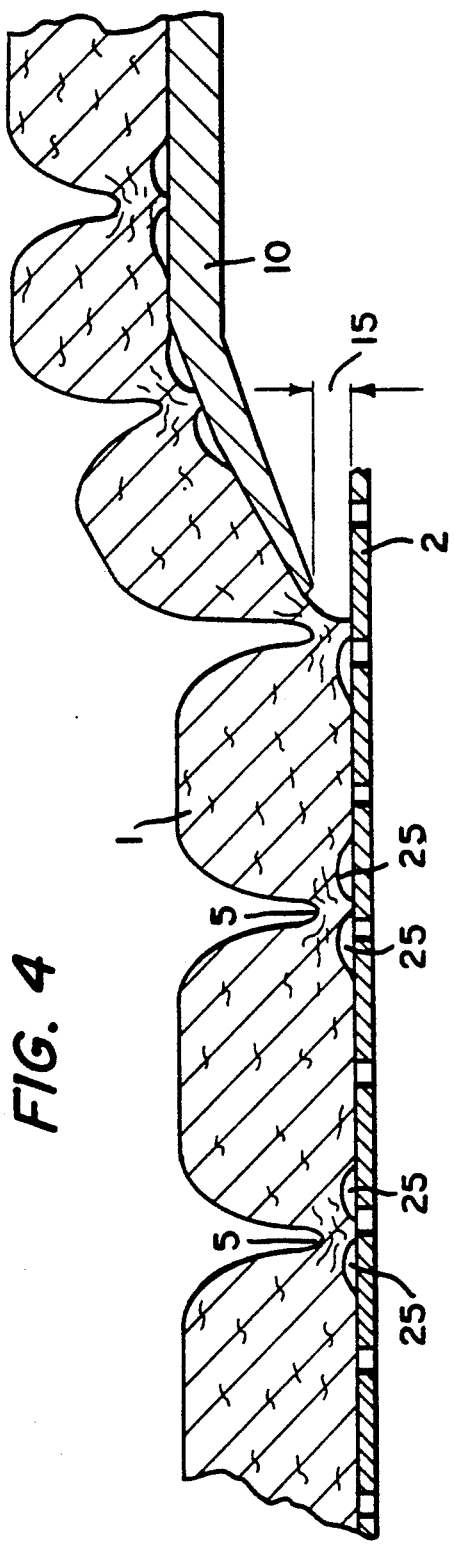
FIG. 4 is an illustration of a pulp sheet near a doctor blade.

FIG. 2 is an enlarged transverse view of the doctor 10 and the air, water or steam knife 11 acting upon the pulp sheet 1. The doctor gap 15, shown in FIG. 4, is maintained between the doctor 10 and the smooth porous drum 2. A gap 15 of approximately 3 millimeters between the doctor 10 and the drum 2 has been found to be generally effective in avoiding contact between the doctor 10 and the drum 2. It is this gap that presents the possibility of passage beneath the doctor of a split pulp sheet or pulp crumbs.

The primary force holding the pulp sheet 1 on the drum deck 2 is the surface tension of the liquid remaining in the pulp sheet after passing through the dewatering zone. The strength of the surface tension force is a direct function of the area over which that force acts. Therefore, in order to reduce the surface tension force holding the pulp sheet 1 to the drum 2, it is desirable to reduce the surface contact area between the pulp sheet 1 and the drum 2.

FIG. 3 is a schematic representation of the reduction of surface contact area between the pulp sheet 1 and the smooth porous drum 2 caused by the action of the pulp compressor 20 which may be independently driven by its own variable speed drive (29 in FIG. 1), or which may be idle and be driven by the motion of the pulp sheet 1 with the filter surface 2 beneath the compressor 20. The blunt and round-edged compressor vanes 22 are mounted on the compressor roll 21. The lifted areas 25 which are created next to the compressed pulp areas 5 of the pulp sheet 1 due to the action of the pulp compressor 20 result from the elongation of the pulp sheet 1 along the circumference of the drum 2 caused by the compression induced by the compressor vanes 22. Some lifting is also caused by slight speed variations between the drum and the compressor which causes a scraping action and by the pulling action of the compressor vanes on the pulp as they rotate away from the drum. Whether driven by its own drive or by its contact with the pulp sheet, the compressor may move at the same speed as, faster than, or slower than the pulp sheet to optimize the lifting effect. In addition to reducing the surface tension force between the pulp sheet 1 and the drum 2 the round-bottomed compression of the pulp seen here causes an increase in the through-thickness tensile strength of the pulp sheet. This increase is primarily due to the closer contact of the pulp fibers which results from the compression of the pulp sheet. Of course, the degree of increase of this through-thickness tensile strength in the pulp sheet will be dependent upon the fiber length of the pulp and other pulp characteristics. Thus, depending upon pulp characteristics, the desired pulp sheet compression will vary between 60% and 95% of the original pulp sheet thickness while still maintaining the 3 millimeter roll gap.

The lowering of surface tension due to the reduction of contact area between the pulp sheet and the drum, together with the through-thickness tensile strength increase for the pulp sheet in the areas of localized compression, makes the doctor significantly more effective in removing the pulp sheet and achieving a clean drum.

Figure 5:
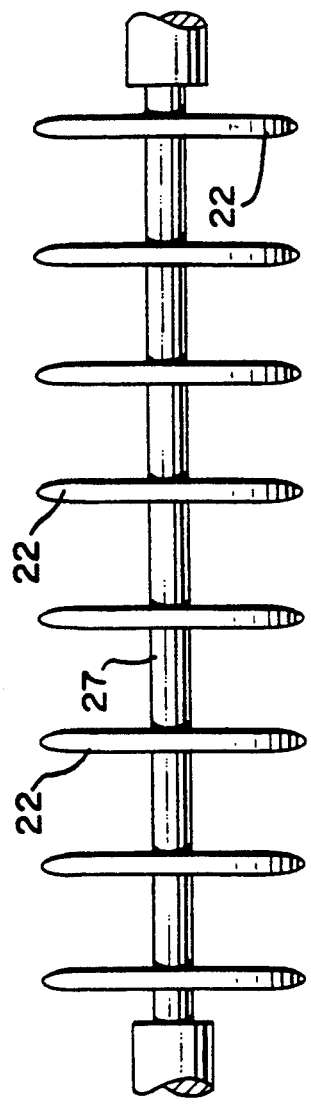
FIG. 5 is an alternative form of compressor vanes.

FIG. 4 is an enlarged sketch illustrating the closer fiber contact and some fiber orientation within the pulp sheet due to the compression. Note that the compressed areas 5 of the pulp sheet 1 are associated with lifted areas 25. Also note that the doctor blade 10 is separated by a doctor gap 15 from the smooth porous filter surface 2. Although shown here as a flat filter surface, the filter configuration may be any of those types commonly used. FIG. 5 show an alternative design of the compressor 20 of the present invention. Here, the vanes are "pizza cutter" style circumferential disks 22 mounted on an axle 27 to longitudinally compress pulp sheet 1.

From this discussion and from the figures, it can be seen that the operation of the pulp compressor 20 is simple. It should be noted that the compressor vanes 22 do not make contact with the filter surface 2 but rather maintain the same gap as that at which the doctor blade 10 is set. Thus, establishing the pattern of intermittent compression of the pulp sheet is accomplished while maintaining a gap between the pulp compressor, the doctor blade, and the drum. This gap then prevents any mutual damage between the drum, the doctor blade, and the pulp compressor yet still yields a clean drum after passing beneath the doctor. This has been found to be true for all practical basis weights and other pulp characteristics as well as for all pulp consistencies in the operating range of 10% to 18% discharge consistency. In those rare cases where the pulp sheet thickness is less than or equal to the doctor gap, the air, steam, or water nozzle assistance becomes necessary to achievement of a clean filter surface.

Note that the pulp compressor may be a roll, as described, or a reciprocating tamper plate or other form. The choice depends upon the type of filter, the pulp characteristics, and the required compression pattern.

While the invention has been illustrated and described in accordance with the preferred embodiment, it is recognized that variations and changes may be made therein without departing from the invention as set forth in the claims. For example, instead of longitudinal compressor vanes on the compressor roll, the pulp compressor could consist of a series of disks mounted on an axle whose edges would compress the pulp sheet circumferentially on the drum. Other possible variations of the compression pattern will be apparent to those who are skilled in the art.

I claim:

1. An apparatus for aiding in the continuous removal of a wet fibrous material pulp sheet from a smooth porous filter surface comprising:

means for impressing a pattern of round-bottomed compression irregularities upon said fibrous material pulp sheet; and doctor means for lifting said pulp sheet away from said filter surface.

2. The apparatus, according to claim 1, wherein said means for impressing is a roller which has a plurality of round-edged radial projections and which is driven by contact with the fibrous material pulp sheet.

3. The apparatus, according to claim 1, wherein said means for impressing is driven by a separate drive so that it moves independently of the fibrous material pulp sheet.

4. The apparatus, according to claim 1, wherein said means for impressing is a roller having round-edged longitudinal vanes.

5. The apparatus, according to claim 1, wherein said means for impressing is a roller having round-edged circumferential disc shaped vanes.

6. In combination with a doctor blade and a fluid knife, an apparatus for aiding in the removal of a wet fibrous pulp sheet from a smooth porous filter surface comprising:
   means for impressing a pattern of round-bottomed compression irregularities upon said pulp sheet, said means for impressing further compressing:
   a roll having its axis transversely oriented with respect to the relative travel direction of the pulp sheet and parallel to the line along which contact occurs between said roll and said pulp sheet; and
   a plurality of blunt round-edged radially projecting vanes disposed about the circumference of said roll and along the length of said roll, said vanes having a radial surface travel direction the same as that of the pulp sheet and a radial extent such that they compress the pulp sheet without contacting the filter; and
   means for conducting said pulp sheet away from said filter surface.

7. The apparatus, according to claim 6, wherein said means for impressing is set to compress the pulp sheet by 60 to 95%.

8. The apparatus, according to claim 6, wherein the surface speeds of said pulp sheet and said means for impressing are approximately equal.

9. The apparatus, according to claim 6, wherein the surface speed of said means for impressing is slightly less than the surface speed of said pulp sheet.

10. The apparatus, according to claim 6, wherein the surface speed of said means for impressing is slightly greater than the surface speed of said pulp sheet.

11. A method for promoting continuous release of a wet pulp sheet, formed by an inwardly directed pressure differential, from a smooth porous moving wash filter surface comprising the steps of:
    interrupting the inwardly directed pressure differential through the filter;
    continuously impressing an indented pattern of localized round-bottomed compression irregularities on the pulp sheet as it approaches the zone of interrupted inward pressures to cause local lifting of the pulp sheet; and
    employing a doctor means for lifting the pulp sheet from the filter surface.

12. In a smooth porous pulp washing filter, having forming, washing, and take-off zones, wherein a wet pulp sheet is continuously formed by filtering the pulp slurry to extract a portion of the pulp liquor and removed in a take-off zone, the improvement comprising:
    means for impressing a pattern of round-bottomed localized compression irregularities on the pulp sheet to cause localized lifting of the pulp sheet as it enters the take-off zone; and
    means for conducting said pulp sheet away from said filter surface.

* * * * *